Sept. 19, 1967    T. W. HOWE    3,342,479
WELDING CLAMPS
Filed Jan. 14, 1964    2 Sheets-Sheet 1
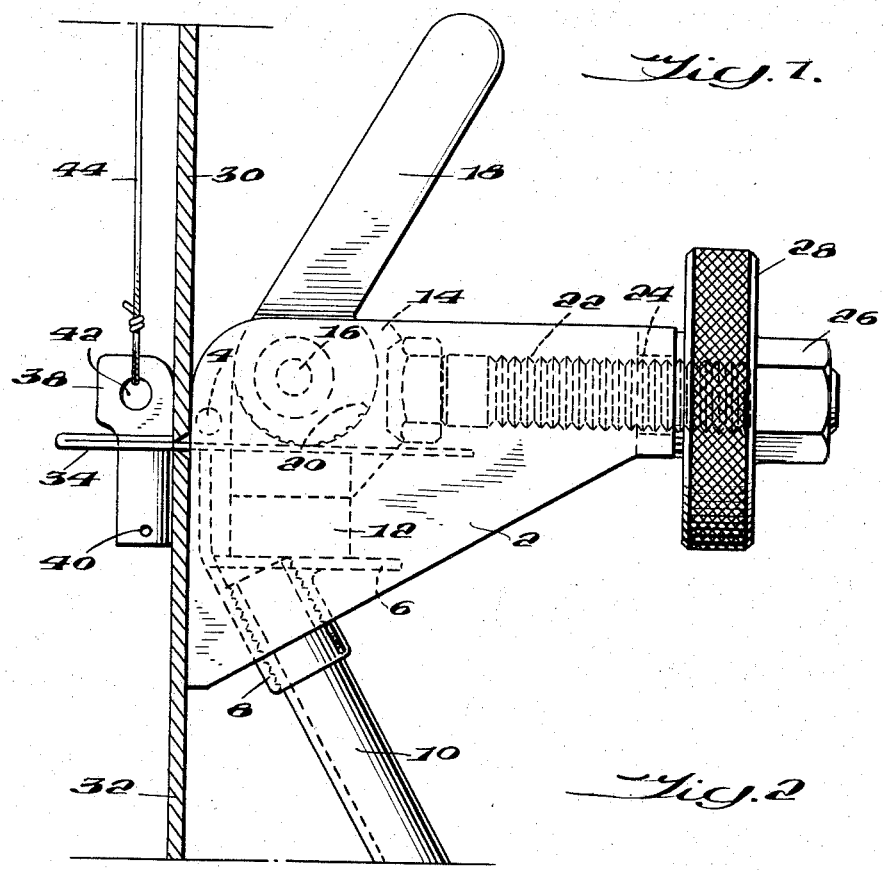
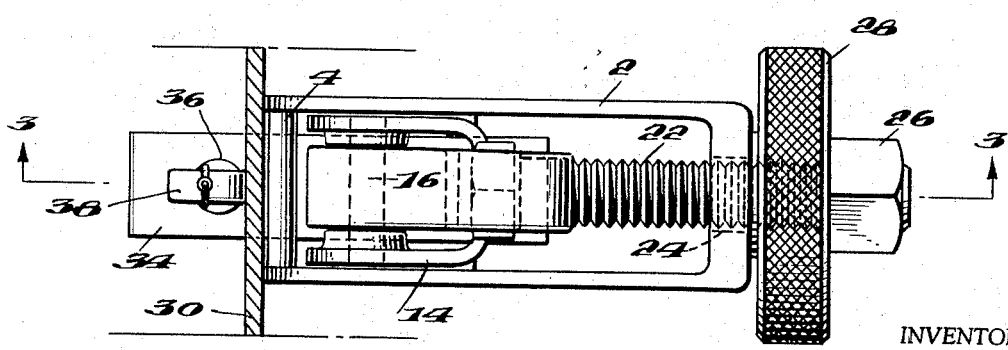
INVENTOR
THOMAS W. HOWE,
BY
Burns, Doane, Benedict, Swecker & Mathis
ATTORNEYS

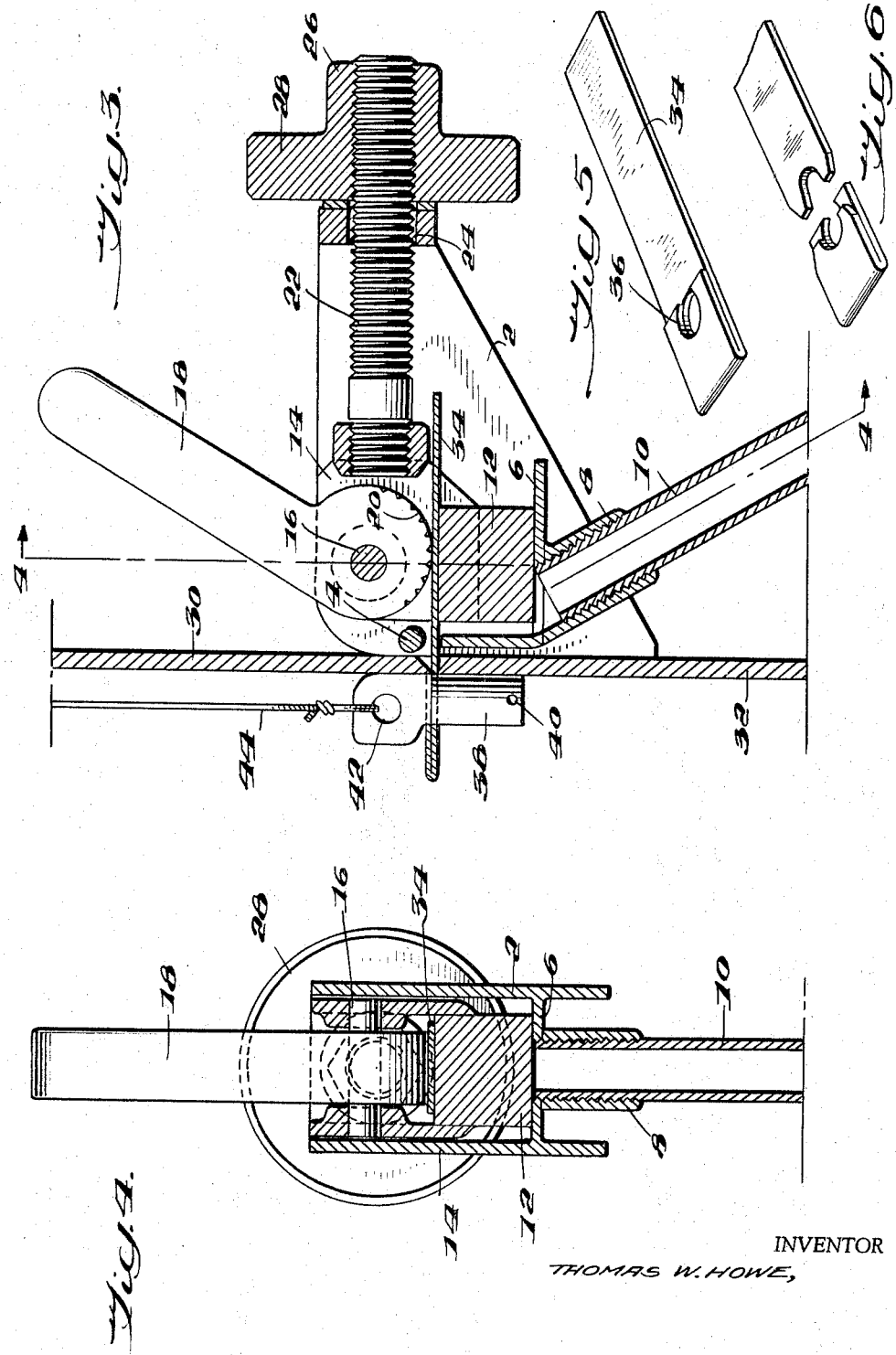

United States Patent Office 3,342,479
Patented Sept. 19, 1967

3,342,479
WELDING CLAMPS
Thomas W. Howe, Duncan, Okla., assignor to Halliburton Company, Duncan, Okla., a corporation of Delaware
Filed Jan. 14, 1964, Ser. No. 337,573
9 Claims. (Cl. 269—204)

This invention relates to welding clamps and, more particularly, to a method and apparatus for temporarily fastening together plates in end-to-end abutting relation.

A butt weld is made by supporting metal plates in coplanar, edge abutting relation and welding along the joint between the plates. If the plates are relatively large, it is difficult to maintain them in alignment while they are being welded together. Therefore, clamps must be used for holding the plates in abutting relation. The welding clamps must be adjustable to accommodate plates of various thicknesses. In production welding, it is important that the clamps be quickly adjusted, applied to the workpieces and removed after welding, and accordingly, the clamps must be relatively simple to operate.

It is particularly difficult to maintain cylindrical plates in alignment. The plates may not be completely circular and in clamping them together for welding, it may be necessary to exert a radial force on the plates to move their edges into alignment. Conventional welding clamps are not suitable for this purpose either because they are not sufficiently strong, or they do not have means for pulling the plate edges into alignment. Furthermore, if the plates that are to be welded together form a closed container, conventional welding clamps, which are applied to opposite sides of the joint, cannot be used because there is no way to remove the clamps. The portion of the clamps on the inside of the closed container is inaccessible after the plates are welded together and the clamps cannot be released from the inside.

In view of the defects of prior welding clamps, it is an object of this invention to provide an improved welding clamp which is adjustable for butt welding plates of various thicknesses.

It is a further object of this invention to provide a welding clamp which is quickly and easily applied and removed.

It is a still further object of this invention to provide a welding clamp which temporarily secures the plates in end-to-end abutting relation and in alignment.

It is another object of this invention to provide a welding clamp which may be released from only one side of a welded joint, without requiring access to the opposite side of the joint.

These objects are accomplished in accordance with a preferred embodiment of the invention by a clamp having a slide therein. An anvil is mounted in the slide and the slide is movable longitudinally relative to the frame by a lead screw which is connected between the slide and the frame. A nut on the lead screw cooperates with an abutment on the frame to adjust the position of the slide within the frame. A lever is also mounted on the slide opposite the anvil for swinging movement. The lever has a cam surface of circumferentially increasing radius and cooperates with the anvil to wedge against and clamp a coupon or frangible link which is inserted between the lever and the anvil.

The coupon has one end folded over to form a double thickness and a hole extends through both thicknesses of the coupon. A pin is inserted through the hole in the coupon and the opposite end of the coupon is inserted between the cam lever and the anvil. The plates which are to be welded are then inserted between the pin and the clamp frame, so that the coupon extends through the joint between the plates, with the edge of the folded end in engagement with the surface of the upper plate. The clamp is tightened by turning the nut on the screw to move the slide away from the joint and cause the cam to grip the coupon. This movement of the slide also pulls the pin against the surface of the plates, thereby moving them into alignment. After tack welds have been made, the clamp is removed simply by turning the nut until the coupon breaks along the edge of the folded end.

This preferred embodiment of the invention is illustrated in the accompanying drawings in which:

FIG. 1 is a side elevational view of the clamp of this invention as applied to workpieces;
FIG. 2 is a top plan view of the clamp;
FIG. 3 is a cross sectional view of the clamp along the line 3—3 in FIG. 2;
FIG. 4 is a cross sectional view of the clamp along the line 4—4 in FIG. 3;
FIG. 5 is a perspective view of the coupon; and
FIG. 6 is a perspective view of the coupon as in FIG. 5, but inverted to show the fractured portions of the coupon.

The welding clamp of this invention includes a hollow frame 2 having opposite sides connected together at one end. The frame also has at the other end a pin 4 which is welded or otherwise secured to the sides of the frame 2. A web 6 extends between the sides of the frame 2, and a socket 8 is mounted under the web 6 for receiving a handle 10, which is threaded into the socket.

An anvil 12 is supported on the web 6 for sliding movement and a bifurcated bracket 14 is secured to the anvil 12. The bracket 14 has a pin 16 secured therein and a lever 18 is journaled on the pin for swinging movement relative to the bracket. The portion of the lever 18 opposite the anvil 12 is in the form of a cam 20. The cam 20 is shaped to gradually reduce the separation between the cam and the anvil 12 as the lever swings in one direction. An adjusting screw 22 is secured to one end of the bracket 14 so that it does not rotate relative to the bracket. The screw extends through an opening 24 in the end of the frame 2 and a nut 26 is threaded on the end of the screw 22. A wheel 28 is formed on the nut 26 and bears against the end of the frame 2, and upon rotation of the wheel 28 in one direction, the bracket 14 is drawn toward the wheel 28 by the screw 22.

The clamp frame 2 is fastened to an upper plate 30 and a lower plate 32 by a coupon 34. The plates are aligned in abutting relation, and in accordance with usual welding practice, the edges of the plates may be beveled. The coupon 34 extends through the joint between the plates 30 and 32 and between the cam 20 on the lever 18 and the anvil 12. The lever 18 is normally in the position shown in FIG. 1, so that the weight of the lever urges the cam 20 to be rotated sufficiently to engage the surface of the anvil 12, or the coupon 34 which is inserted between the anvil and the cam. When the coupon has been inserted between the cam 20 and the anvil 12, it cannot be withdrawn by pulling on the opposite end of the coupon, since the cam 20 wedges the coupon against the anvil 12.

As shown in FIG. 5, the coupon 34 is a flat strip, preferably metallic, with one end of the strip folded back upon itself and a hole 36 is drilled through the double thickness adjacent the transverse edge of the folded end. A pin 38 fits in the hole 36 and, since one side of the pin is substantially straight, it cooperates with the frame 2 to urge the plates 30 and 32 into alignment. The hole 36 intersects the transverse edge of the strip, and when the pin 38 is seated in the hole 36, the straight side of the pin and the edge of the strip lie in substantially the same plane. A cotter pin may be used in the hole 40, if desired, to prevent the pin from falling out of the hole.

the pin 38 is also provided with a hole 42 through which wire 44 may be fastened.

The clamp is first applied to the lower plate 32 by inserting the coupon 34, with the pin 38 seated in the hole 6, between the anvil 12 and the cam 20 on the lever 8. The coupon is inserted into the frame 2 until the pin 38 engages the lower plate 32 and the end of the frame 2 engages the lower plate 32. The wheel 28 is then turned to move the bracket 14 toward the wheel until the pin 38 and the frame 2 are firmly clamped against the plate 32. The plate 30 is then inserted between the pin 38 and the end of the frame 2, so that it lies in the position shown in FIGS. 1, 2 and 3. The wheel 28 is again turned until both plates are firmly held in alignment between the pin 38 and the frame 2. Tack welds are then made adjacent the clamp to support the plates 30 and 2 in their aligned position.

The clamp may then be removed by turning the wheel 8 until the coupon is stressed sufficiently to break, thereby releasing the pin 38 and the frame 2 from the welded plates 30 and 32. As shown in FIG. 5, the hole in the coupon intersects the transverse edge of the folded end and, since the pin 38 resists movement of the coupon toward the frame 2, the maximum tensile stress is applied in the portion of the coupon which lies in the joint between the plates 30 and 32. When the coupon is stressed by turning the wheel 28, the portion of the strip adjacent the hole is elongated, since the strip has the smallest cross section at the hole. As the strip stretches, its thickness at the hole decreases, thereby providing clearance between the coupon and the adjacent edges of the plates 30 and 32 to ensure that the broken end of the coupon and the pin 38 will fall away freely from the joint. In FIG. 6, the coupon is shown after it has broken. The coupon is inverted from the position shown in FIG. 5 in order to illustrate the manner in which the coupon breaks. Since the folded end is not distorted, the hole in the folded end continues to support the pin 38 after the coupon is broken.

The clamp of this invention is particularly well suited for temporarily securing together the edges of cylindrical shells which form a vessel or container. For example, the plates 30 and 32 may represent the two halves of a hollow cylinder having opposite closed ends, and there is no access to the interior of the cylinder for applying or removing conventional clamps on opposite sides of the joint. The clamp of this invention, however, can be used for holding the cylindrical shells 30 and 32 together while they are being tack welded. The clamps are applied along the edge of one of the cylindrical plates 32 in the manner previously described. A cotter pin may be inserted in the hole 40 for preventing separation of the pin 38 and the end of the coupon 34 after it is broken, and a wire 44 may be tied through the hole 42 in the pin 38 and extend to the next adjacent clamp where it is fastened to the corresponding pin 38. The end of the wire which connects together each of the pins 38 around the circumference of the cylindrical plate 32 is led out through a small opening provided in the cylinder. The other plate 30 is then fitted into position between the frame 2 and the pin 38 of each of the clamps spaced around the circumference of the cylinder. The wheel 28 is then tightened sufficiently to hold the plates 30 and 32 in alignment and tack welds are made adjacent each of the clamps. After the tack welds are made, the wheel 28 is turned to break the coupons. The broken folded end of each of the coupons 34 remains connected to its pin 38 and the pins with their attached coupon portions may then be removed from the interior of the shell by withdrawing the wire 44 through the opening.

The welding clamp of this invention rigidly holds the plates in abutting relation while they are tack welded, and yet it may be easily applied and removed. Furthermore, the clamp provides a quick and practical means for welding plates where one side of the joint is inaccessible after the weld is made. The clamp is versatile and may be used for clamping plates of various thicknesses, since the cam surface 20 may grip the coupon 34 at any position along the length of the coupon.

While this invention is illustrated and described in one embodiment, it is recognized that variations and changes may be made therein without departing from the invention as set forth in the claims.

I claim:

1. A clamp comprising a frame, a flat strip, said strip having one end folded in overlapping relation with a portion of the remainder of the strip and having a hole in the folded end in axial alignment with a hole in said remainder portion, a pin extending through the hole in the folded end and the hole in the remainder portion, means in the frame for gripping the remainder portion of the strip, means for adjusting the distance between the pin and the frame, and means for selectively breaking the remainder portion of the strip, whereby the pin is retained in the folded end when the strip is broken.

2. A clamp comprising a frame, a bracket mounted in the frame for longitudinal sliding movement relative thereto, means in the frame for sliding the bracket relative to the frame, a flat strip, said strip having one end folded in overlapping relation with a portion of the remainder of the strip and having a hole in the folded end in axial alignment with a hole in said remainder portion, a pin extending through the hole in the folded end and the hole in the remainder portion, anvil means on said bracket, and means on the bracket for clamping the remainder portion of the strip against said anvil means, whereby the link is readily separated from the frame and the distance between the pin and the frame is adjustable for clamping workpieces therebetween.

3. A clamp comprising a frame, a bracket mounted in the frame for longitudinal sliding movement relative thereto, means in the frame for sliding the bracket relative to the frame, a flat strip, said strip having one end folded in overlapping relation with a portion of the remainder of the strip and having a hole in the folded end in axial alignment with a hole in said remainder portion, a pin extending through the hole in the folded end and the hole in the remainder portion, an anvil in the bracket, cam means in the bracket, said cam means being movable for selectively wedging the strip against the anvil, whereby the cam and the anvil grip the remainder portion of the strip as the bracket is adjusted away from the pin.

4. A clamp comprising a frame, a bracket mounted in the frame for longitudinal movement relative thereto, means in the frame for adjusting the position of the bracket relative to the frame, a flat strip, said strip having one end folded in overlapping relation with a portion of the remainder of the strip and having a hole in the folded end in axial alignment with a hole in said remainder portion, a pin extending through the hole in the folded end and the hole in the remainder portion, an anvil on the bracket, cam means on the bracket adjacent the anvil, said cam means being movable for selectively clamping the remainder portion of the strip against the anvil, whereby workpieces are temporarily clamped between the pin and the frame.

5. A clamp according to claim 1 wherein said hole in said remainder portion has substantially the same size and shape as the hole in the folded end.

6. A clamp according to claim 5 wherein said folded end hole and said remainder portion hole are substantially circular.

7. The clamp according to claim 4 wherein said slide adjusting means includes a screw extending between said slide and said frame, a threaded nut cooperating with said screw for displacing said slide relative to said frame, said cam means including a lever mounted for swinging movement on said slide and including an arcuate cam surface adjacent said anvil, said cam surface being in position to form a gap between said surface and said anvil, whereby the thickness of said gap being progressively reduced by swinging said lever in one direction.

8. A frangible link for temporarily securing together workpieces comprising an elongated flat strip of substantially uniform width and thickness, said strip having one end folded in overlapping relation with a portion of the remainder of the strip and having a hole in the folded end in axial alignment with a hole in said remainder portion, a separate pin extending through said folded end hole and said remainder portion hole, whereby said pin forms an abutment for cooperating with means gripping the opposite end of the strip to clamp the workpieces therebetween and longitudinal stretching of the remainder portion breaks the strip at the remainder portion hole while leaving the folded end of the strip joined to the pin at the folded end hole, said strip being substantially rectangular, said folded end overlapping substantially the entire perimeter of said remainder portion hole, said folded end terminates in a transverse edge, said edge substantially intersecting said folded end hole, whereby said strip breaks in tension transversely at said folded end.

9. A frangible link according to claim 8, wherein said pin has a substantially straight longitudinal side wall and a thickness as great as the width of said folded end hole, whereby said pin straight side is positioned substantially in alignment with said folded end transverse edge.

References Cited

UNITED STATES PATENTS

| | | | |
|---|---|---|---|
| 416,903 | 12/1889 | Danielson | 269—217 |
| 1,271,564 | 7/1918 | Gordon | 254—77 |
| 1,440,627 | 1/1923 | Rasmussen | 254—67 |
| 1,751,823 | 3/1930 | Lampert | 254—29 |
| 1,796,771 | 3/1931 | Symons | 269—123 |
| 2,380,781 | 7/1945 | Osborne | 269—138 |
| 2,471,145 | 5/1949 | Erickson | 93—1 X |
| 2,672,839 | 3/1954 | Neuhaus. | |
| 2,749,816 | 6/1956 | Jewell | 93—1.1 |
| 2,815,813 | 12/1957 | Goldberg | 269—138 |

FOREIGN PATENTS

| | | |
|---|---|---|
| 1,166,311 | 6/1958 | France. |

HAROLD D. WHITEHEAD, *Primary Examiner.*